United States Patent [19]
Sugitani et al.
[11] 4,450,455
[45] May 22, 1984

[54] INK JET HEAD

[75] Inventors: Hiroshi Sugitani, Machida; Masakazu Ozawa; Hiroto Matsuda, both of Yokohama; Masami Ikeda, Chiba; Haruyuki Matsumoto, Tokyo, all of Japan

[73] Assignee: Canon Kabushiki Kaisha, Tokyo, Japan

[21] Appl. No.: 383,099

[22] Filed: May 28, 1982

[30] Foreign Application Priority Data

Jun. 18, 1981 [JP] Japan .................................. 56-94881
Jun. 18, 1981 [JP] Japan .................................. 56-94882

[51] Int. Cl.[3] .............................................. G01Q 15/16
[52] U.S. Cl. .................................................. 346/140 R
[58] Field of Search .......................... 346/1.1, 75, 140; 239/102

[56] References Cited

U.S. PATENT DOCUMENTS 4,169,008 9/1979 Kurth ................................ 346/75 X

FOREIGN PATENT DOCUMENTS 55-49275 4/1980 Japan ........................................ 346/75
53138544 5/1980 Japan .................................. 346/140 PQ
55-107481 8/1980 Japan .................................. 346/140 PQ

*Primary Examiner*—Donald A. Griffin
*Attorney, Agent, or Firm*—Fitzpatrick, Cella, Harper & Scinto

[57] ABSTRACT

An ink jet head comprises an orifice plate constituted of a hardened film of a photosensitive resin having an orifice which extends therethrough in the direction of its thickness.

7 Claims, 7 Drawing Figures

INK JET HEAD

BACKGROUND OF THE INVENTION

1. Field of the Invention

This invention relates to an ink jet head, and, more particularly, to an ink jet head for generation of small ink droplets for recording to be used for the so-called ink jet recording system.

2. Description of the Prior Art

An ink jet head to be applied for the ink jet recording system is generally provided with minute ink discharging outlets (orifices) having apertures of several tens μ to 100μ in diameter, ink flow paths and portions for generating ink discharging pressure provided at a part of said ink flow paths.

As the method for preparing such an ink jet head, there has been known, for example, a method in which minute grooves are formed, by way of cutting or etching, on a plate of a glass or a metal, and then the plate having such grooves is bonded to another appropriate plate for formation of ink flow paths.

However, a head obtained according to the method as described above suffers from a drawback that straight driving characteristic of ink droplets discharged has frequently been impaired. This is due, above all to, the difference in wetting characteristics at the orifice peripheral for the ink, because the orifice of the head is formed of materials having different qualities.

In addition to the above fact, when discharging of an ink has been carried out for a long time or vibration is applied to a head, the ink leaked out from the orifice may be adhered to a part of the orifice circumference and then combined to form an ink pool, which will attract the ink droplets discharged toward its direction, thereby impairing straight driving characteristic of ink droplets.

In the prior art, in order to overcome such an inconvenience, it has been proposed to prepare separately a flat plate provided with orifice by forming an orifice on a flat plate (e.g., a metal plate or a photosensitive glass plate) by etching thereof (this is hereinafter referred to as "orifice plate") and then attaching the orifice plate onto a head body to give an ink jet head.

According to this method, however an, orifice is formed by etching and therefore strains may be formed in the orifices obtained due to the difference in the degree of etching, or the shapes of orifices may vary considerably, whereby it is difficult to prepare an orifice plate which is very precise. Thus, the ink jet head prepared by this method has the drawback that straight driving characteristic of the ink droplets discharged could not be sufficiently improved.

Further, in the above method, an orifice plate is required to be attached to a head body. During such an operation, dimensional precision is liable to be less. In addition, there are other disadvantages such as the adhesive employed in this operation may flow into orifices or ink flow paths which are very minute to effect clogging thereof, thus impairing the function inherent in an ink jet head.

SUMMARY OF THE INVENTION

The primary object of the present invention is to provide an ink jet head which has overcome the various drawbacks of prior art ink jet heads as described above and is also provided with a further specific feature.

One object of the present invention is to provide an ink jet head which can ensure straight driving characteristic of ink jet droplets discharged for a long term.

Another object of the present invention is to provide an ink jet head which is precise and also very reliable.

A further object of the present invention is to provide an ink jet head having a construction which is very precise as to the ink flow paths including orifices.

Further, it is also another object of the present invention to provide a multi-orifice type ink jet head which can be produced by a simple method with good yield and has excellent durability.

According to the present invention, there is provided an ink jet head which comprises an orifice plate constituted of a hardened film of a photosensitive resin having an orifice which extends therethrough in the direction of its thickness.

DETAILED DESCRIPTION OF THE PREFERRED EMBODIMENTS

Referring now to the accompanying drawings, preferred embodiments of the present invention are to be described in detail.

FIGS. 1 through 4 are schematic drawings for illustration of an embodiment of the ink jet head and its preparation steps.

Figure 1:
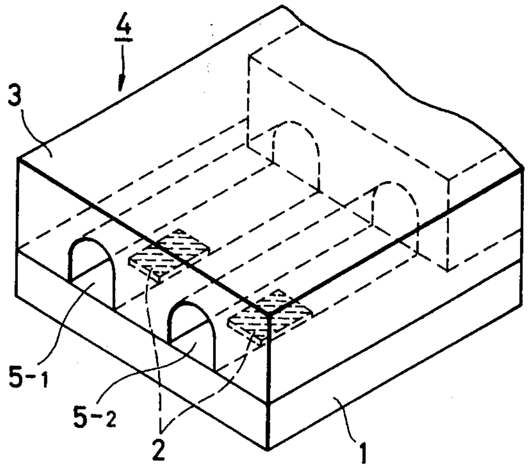
FIG. 1 and FIG. 2 are schematic perspective views of parts of an embodiment of the ink jet head according to the present invention.

First, as shown in FIG. 1, on an appropriate substrate 1 of a glass, a ceramic, a plastic or a metal, there are arranged ink discharging pressure generating elements 2 in a desired number (two in the drawings) such as heat generating elements, piezoelectric elements and the like, and the substrate 1 is joined with another plate 3 having grooves for ink flow paths to prepare a head body 4. In the drawings, 5-1 and 5-2 are all ink discharging outlets (orifices) in the head body 4. When heat generating elements are used as the ink discharging pressure generating elements 2, ink discharging pressure is generated by heating the ink in the neighborhood of these elements with these elements. On the other hand, when piezoelectric elements are employed, ink discharging pressure is generated by mechanical displacement or vibration of these elements and electrodes not shown for signal input are connected to these elements 2.

The constitution of such a head body 4 is not related directly to the subject matter of the present invention, and therefore, any further details thereof are omitted.

Figure 2:
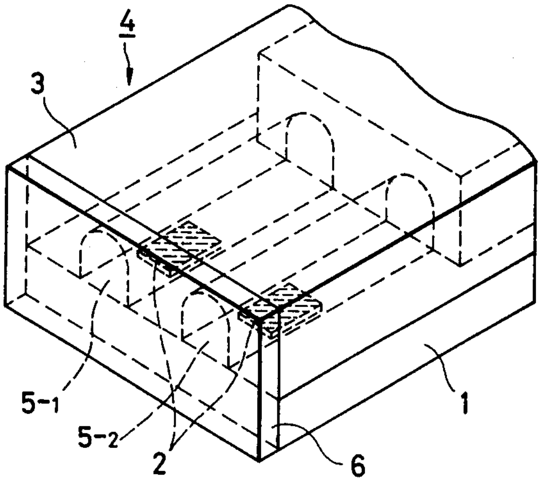

Next, as shown in FIG. 2, after the end surface on the orifice side of the head body 4 is cleaned and dried (during this operation, said end surface may sometimes be roughened), a dry film photoresist 6 (film thickness: about 25μ to 100μ) heated to about 80° C. to 105° C. is pressure bonded onto said end surface at a speed of 0.5 to 4 feet/min. under pressurization condition of 1-3 kg/cm$^2$. The dry film photoresist 6 is thereby fixed partially in a fusion bonded state, and will thereafter never be peeled off from the head body 4 even when a considerable external pressure is applied thereto.

Figure 3:
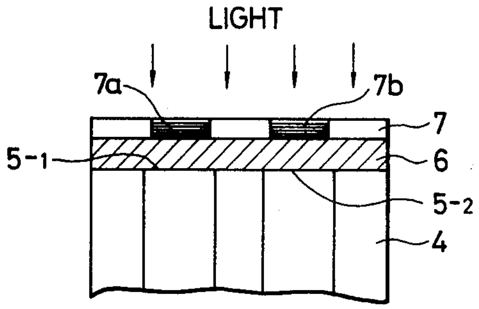
FIG. 3, FIG. 4, FIG. 6 and FIG. 7 are schematic sectional views of parts of an embodiment of the ink jet head according to the present invention.
Figure 4:
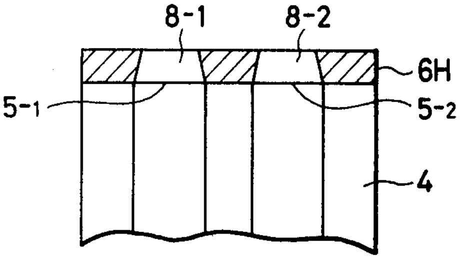

Subsequently, as shown in FIG. 3, a photomask 7 having mask patterns 7a and 7b corresponding to orifices of desirable shape are superposed on the dry film photoresist 6 fixed to the end surface on the orifice side of the head body 4, and then light is projected to said mask 7. Since the patterns 7a and 7b do not transmit light, the dry film photoresist 6 in the region covered by these patterns 7a and 7b is not subjected to light exposure. In carrying out this procedure, an accurate positioning is conducted according to a conventional manner so that the centers of the mask patterns 7a and 7b may fall on the centers of the orifices 5-1 and 5-2, respectively, of the head body 4. When subjected to light exposure as described above, the region except the portions corresponding to the patterns 7a and 7b, namely, the exposed photoresist 6, undergoes polymerization reaction to be hardened, thus being rendered insoluble in a solvent. On the other hand, the photoresist 6 not exposed to the light, is not hardened and remains soluble in a solvent. After such a light exposure procedure, the dry film photoresist 6 is immersed in a volatile organic solvent, for example, trichloroethane for dissolving away unpolymerized (unhardened) photoresist, whereby there are formed thru-holes 8-1 and 8-2 (FIG. 4) corresponding to the patterns 7a and 7b through the hardened photoresist film 6H. Then, for the purpose of enhancing solvent resistance of the hardened photoresist film 6H remaining at the end surface on the orifice side of the head body 4, the film is subjected to further hardening. Such a hardening may be conducted according to heat polymerization (heating at 130° C. to 160° C. for about 10 to 60 minutes), UV-ray irradiation or a combination thereof. Thus, the thru-holes 8-1 and 8-2 formed through the hardened photoresist film 6H corresponding to the orifice plate may have any desired lateral cross-sectional shape (not shown) such as circular, square shapes and the like. The longitudinal cross-sectional shapes of the thru-holes 8-1 and 8-2 may also be freely varied, as desired such as in the form tapered narrower toward the ink discharging direction, or, alternatively, in the form broadened towards the tip or in a straight form.

In this embodiment, when the mask patterns 7a and 7b were made circular with a diameter of 60μ, the thru-holes 8-1 and 8-2 actually formed through the photoresist hardened film 6H (thickness: 50μ) were obtained with a precision of about ±5μ. For the purpose of reference, when the same thru-holes as in the above embodiment were formed on a silicon flat plate by etching methods, its precision was about ±15μ.

The positional deviation between the orifices 5-1, 5-2 and the thru-holes 8-1, 8-2 was found to be about ±5μ in this embodiment, but that of the latter method was as high as ±30μ. As the result, when the shot attaching precisions of the ink jetted out from the heads provided with respective orifice plates as described above are compared between the present invention and the prior art, the shot attaching precision of the present invention was superior by about 5 times to that of the prior art.

Turning now to FIG. 1, FIG. 2 and FIG. 5 through FIG. 7, another embodiment of the present invention is to be described. The detailed description about FIG. 1 and FIG. 2 is the same as in the first embodiment previously described and therefore it is omitted in this embodiment by incorporating the corresponding description by way of reference.

Figure 5:
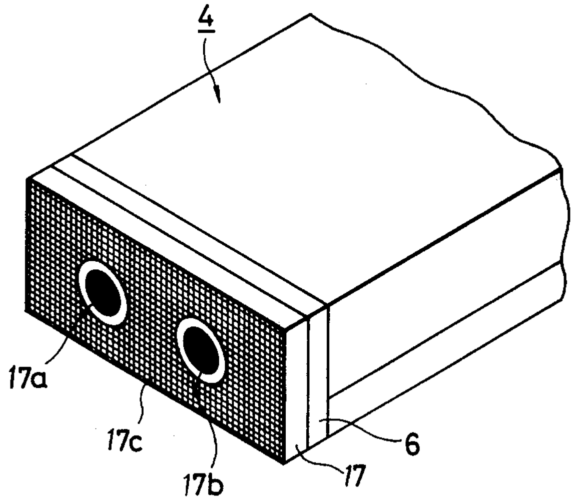
FIG. 5 is a perspective view of the overall appearance of a part of an embodiment according to the present invention.
Figure 6:
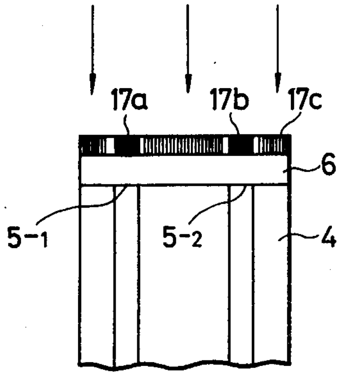

As described above, after completion of the preparation step as shown in FIG. 2, on the dry film photoresist 6 fixed at the end surface on the orifice side of the head body 4 as shown in FIG. 5, there is superposed a photomask 17 having mask patterns 17a and 17b corresponding to orifices of desired shapes and a mesh-like pattern 17c around said mask patterns, followed by projecting light to said mask 17 (as in FIG. 6). Since the above patterns 17a, 17b and 17c do not transmit light, the dry film photoresist at the regions covered by these patterns 17a, 17b and 17c is not subjected to the light exposure. An accurate positioning is conducted in a conventional manner, before the exposure, so that the centers of the mask patterns 17a and 17b may coincide with the centers of the orifices 5-1 and 5-2 of the head body 4, respectively. The dry film photoresist 6 at the region covered by the mesh-like pattern 17c, is not completely masked and therefore, is slightly exposed. In addition, the peripherals of the patterns 17a and 17b corresponding to orifices are arranged so that they may be exposed in annular shapes as shown in the drawing. This is because the peripherals themselves of the orifices may otherwise be roughened in the subsequent developing treatment step (dissolving the unhardened resist), whereby straight driving characteristic of ink droplets discharged may be undesirably lowered.

Figure 7:
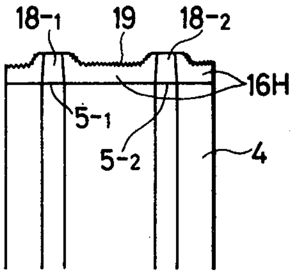

When subjected to light exposure as described above, the region except the patterns 17a and 17b, namely, the exposed portion of photoresist 6, undergoes polymerization reaction to be hardened, thus being rendered insoluble in a solvent. On the other hand, the portion of photoresist 6 not exposed to light is not hardened and remains soluble in a solvent. After such a light exposure procedure, the dry film photoresist 6 is immersed in a volatile organic solvent, for example, trichloroethane for dissolving away unpolymerized (unhardened) photoresist, whereby there are formed thru-holes 18-1 and 18-2 corresponding to the patterns 17a and 17b through the hardened photoresist film 16H, and uneven surface 19 (FIG. 7). Then, for the purpose of increasing solvent resistance of the hardened photoresist film 16H remaining at the end surface on the orifice side of the head body 4, the film is subjected to further hardening. Such a hardening may be conducted according to heat polymerization (heating at 130° C. to 160° C. for about 10 to 60 minutes), UV-ray irradiation or a combination thereof.

Thus, the thru-holes 18-1 and 18-2 formed through the hardened photoresist film 16H corresponding to the orifice plate may have any desired lateral cross-sectional shape (not shown) such as circular, square shapes and the like. The longitudinal cross-sectional shapes of the thru-holes 18-1 and 18-2 may be also freely varied, as desired, such as in the form tapered narrower toward the ink discharging direction, or, alternatively, in the form broadened towards the tip or in the straight form.

In this embodiment, when the mask pattern 17a and 17b are made circular with diameters of 60μ, the thru-holes 18-1 and 18-2 actually formed through the photoresist hardened film 16H (thickness: 50μ) were obtained with a precision of about ±5μ. For the purpose of reference, when the same thru-holes as in the above embodiment were formed on a silicon flat plate by etching methods, its precision was about ±15μ.

The positional deviation between the orifices 5-1, 5-2 and the thru-holes 18-1, 18-2 was found to be about ±15μ in case of the present invention, while that of the latter method was as high as ±30μ. As a result, when the shot attaching precisions of the ink jetted out from the heads provided with respective orifice plates as described above were compared between the present invention and the prior art, the shot attaching precision of the present invention was superior by about 5 times to that of the prior art, similarly to the foregoing embodiment.

Further, the degree of unevenness formed on the surface of orifice plate, namely the degree of roughness, can be very freely controlled depending on the mesh size in the mesh-like mask 17_c_ (in FIG. 5) (by controlling the dosage of exposure). Such a mask for roughening the surface of an orifice plate is not limited to the mesh-like mask as employed in the above embodiment, but there may also be employed masks of radially- or parallelly-shaped patterns.

A dry film photoresist as employed in each of the above embodiments is a preferable photosensitive resin to be used in the present invention because of its easiness in handling as well as easy and accurate control of its thickness. Such film types, there are photosensitive resins sold under the trade names of, for example, Permanent Photopolymer Coating RISTON, Solder Mask 730S, 740S, 730FR, 740FR, SM1, etc. produced by Du Pont Co.

As described above, the present invention has a number of effects as enumerated below:

(1) Since the orifices are formed of the same material, with extremely good dimensional precision, straight driving characteristic of ink droplets discharge is excellent with sizes of ink droplets being made uniform.

(2) The surface (face) of the orifice plate is made rough so as to exhibit uniform wettability for ink, so that an ink pool around the orifices will be difficult to form and the straight driving characteristic of ink droplets is stabilized even upon prolonged driving.

(3) Since a number of orifices with the same dimension and shape can be formed simultaneously, high density multi-array ink jet heads can be manufactured easily with excellent productivity.

(4) Orifices of a desired shape can be formed depending on the photomask to be applied.

(5) Since self-adhesiveness of a photosensitive resin is utilized, no particular adhesive is required to be used, and therefore there is no fear of clogging of ink flow paths such as orifices and the like by flowing of such an adhesive into the flow paths.

(6) Registration between the head body and the orifices formed can be done accurately and easily.

(7) Since no etching (strong acids such as hydrofluoric acid and the like) is required to be used, there is also an advantage with respect to safety and hygiene.

What we claim is:

1. An ink jet head comprising an orifice plate made of a hardened film of a photosensitive resin and having an orifice which extends therethrough in the direction of its thickness, said orifice plate having a roughened surface.

2. An ink jet head according to claim 1, wherein said photosensitive resin is a dry film photoresist.

3. An ink jet head according to claim 1, wherein said plate is in the form of a flat plate.

4. An ink jet head according to claim 1, wherein said plate has a thickness of about 25$\mu$ to 100$\mu$.

5. An ink jet head according to claim 1, wherein a plurality of orifices are provided.

6. An ink jet head comprising an orifice plate made of a hardened film of a photosensitive resin and having an orifice which extends therethrough in the direction of its thickness, wherein on a surface of said plate at least the periphery of said orifice has a smooth surface, with other regions of the surface being of a rough surface.

7. An ink jet head according to claim 1, wherein said orifice plate of hardened photosensitive resin is firmly attached to a body of said ink jet head by adhesion.

* * * * *

UNITED STATES PATENT AND TRADEMARK OFFICE

CERTIFICATE OF CORRECTION

PATENT NO. : 4,450,455

DATED : May 22, 1984

INVENTOR(S) : Hiroshi Sugitani et al.

It is certified that error appears in the above-identified patent and that said Letters Patent is hereby corrected as shown below:

Column 1, line 27, after "all" insert a comma and after "to" delete the comma.

Column 1, line 46, after "however" insert a comma and after "an" delete the comma.

Column 2, line 2, after "ensure" insert -- the --.

Signed and Sealed this

*Eighteenth* Day of *December 1984*

[SEAL]

*Attest:*

GERALD J. MOSSINGHOFF

*Attesting Officer* *Commissioner of Patents and Trademarks*